H. H. CHRISTIE.
Harrow.

No. 36,892.

Patented Nov 11, 1862.

Witnesses:
J W Coombs
M. M. Livingston

Inventor:
H. H. Christie
per Munn & Co
Attys.

UNITED STATES PATENT OFFICE.

H. H. CHRISTIE, OF PERCH RIVER, NEW YORK.

IMPROVED DRAG AND CULTIVATOR COMBINED.

Specification forming part of Letters Patent No. 36,892, dated November 11, 1862.

*To all whom it may concern:*

Be it known that I, H. H. CHRISTIE, of Perch River, in the county of Jefferson and State of New York, have invented a new and Improved Drag and Cultivator Combined; and I do hereby declare that the following is a full, clear, and exact description of the same, reference being had to the accompanying drawings, forming part of this specification, in which—

Figure 1:
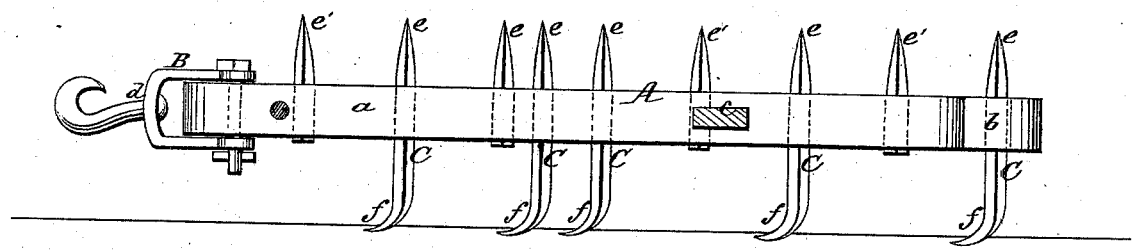
Figure 2:
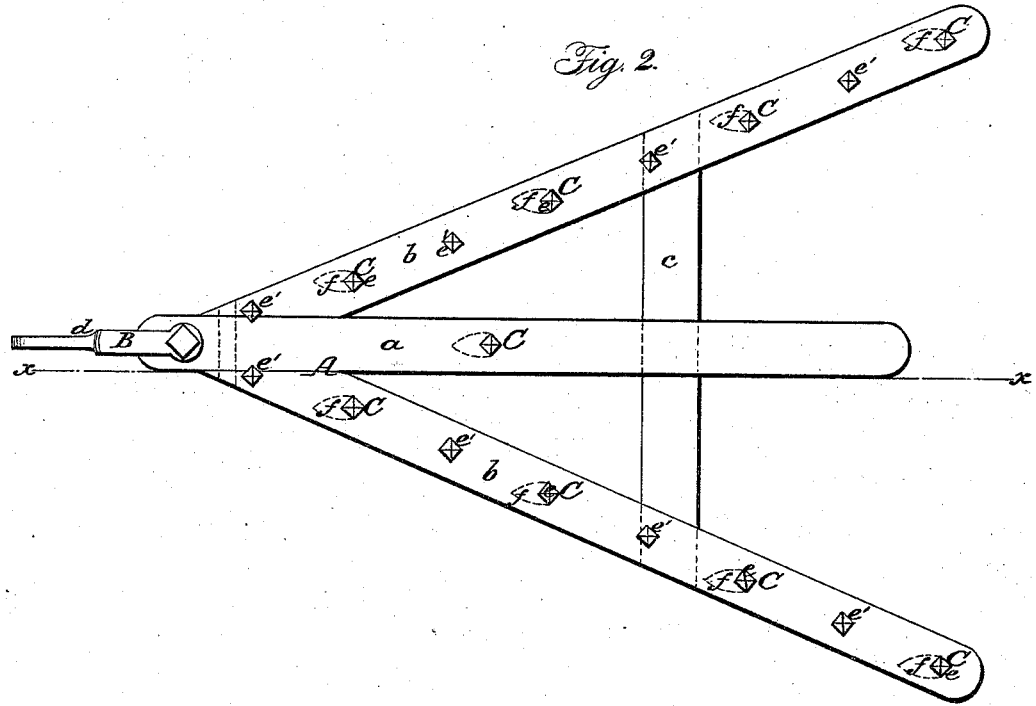

Figure 1 represents a longitudinal vertical section of my invention, taken in the plane indicated by the line $xx$, Fig. 1. Fig. 2 is a plan or top view of the same.

Similar letters of reference in both views indicate corresponding parts.

This invention consists in the arrangement of double-acting teeth provided on one end with sharp square points and on the other with curved flat shares, in combination with a reversible frame, in such a manner that said frame, when used in one position, serves as a drag or harrow, and when reversed it serves as a cultivator.

To enable those skilled in the art to make and use my invention, I will proceed to describe its construction and operation with reference to the drawings.

The frame A is made of a central beam, $a$, to which two deflecting side beams, $b$, are firmly attached, and the whole is strengthened by a cross-bar, $c$.

The clevis B is secured to the front end of the central beam, $a$, and it is provided with a swivel-hook, $d$, which allows of attaching the draft-animals with equal facility whatever surface of the frame may be turned down.

C are the teeth, each of which is provided with a sharp square point, $e$, on one end and with a flat curved share, $f$, on the opposite end. Said teeth pass clear through the several beams of the frame, so that the square points project on one and the flat curved shares on the other side, as clearly shown in Fig. 1 of the drawings. If the frame is brought in such a position that the curved shares $f$ point downward, it serves as a cultivator, and said shares are arranged in such a position on the beams $a$ and $b$ that they cut about four feet wide, (more or less,) and for a cultivator of the ordinary size eleven teeth will be required. If the frame A is turned upside down, so that the square points $e$ act on the ground, we have a harrow or drag. In this case, however, it is desirable to have a larger number of teeth than on the cultivator, and for this reason a number of ordinary harrow-teeth, $e'$, are fastened to that side of the frame A between the double-acting teeth C. The drag will be made to cut about six feet wide, and it will contain thirty-one teeth; but it is obvious that the size of the frame and the number of teeth can be changed at pleasure.

By the use of my double-acting teeth inserted into a reversible frame a combined drag and cultivator is produced the cost of which exceeds but slightly that of either of these implements alone when made in the ordinary manner, and my drag or cultivator will be equally as effective as the ordinary implements for the same purposes.

Having thus fully described my invention, what I claim as new, and desire to secure by Letters Patent, is—

The reversible frame A, provided with the teeth C, one end being pointed and the other curved, constructed and operating as and for the purposes set forth.

H. H. CHRISTIE.

Witnesses:
    EDWARD C. VAN DAVOLLEN,
    GEO. A. DEVENDORF.